Nov. 17, 1925.

C. F. DRAPER

ROLLER BEARING

Filed Aug. 9, 1923

Charles F. Draper,
Inventor.
per Attorney.

Nov. 17, 1925. 1,562,312
C. F. DRAPER
ROLLER BEARING
Filed Aug. 9, 1923 2 Sheets-Sheet 2
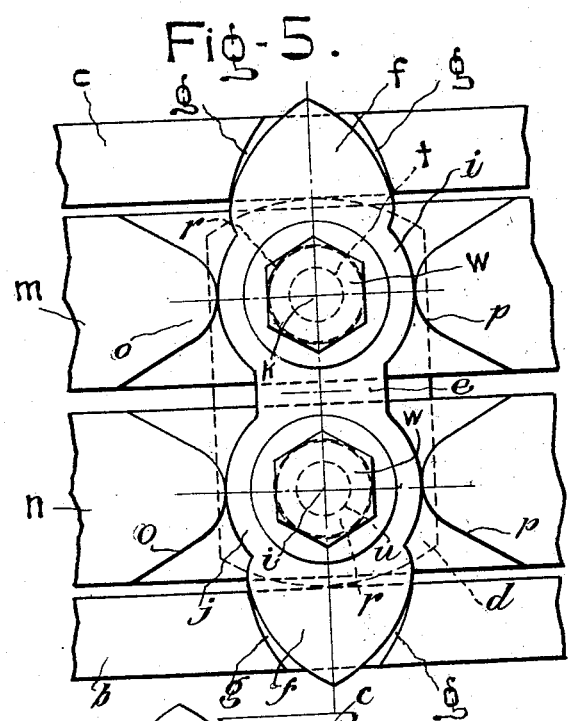
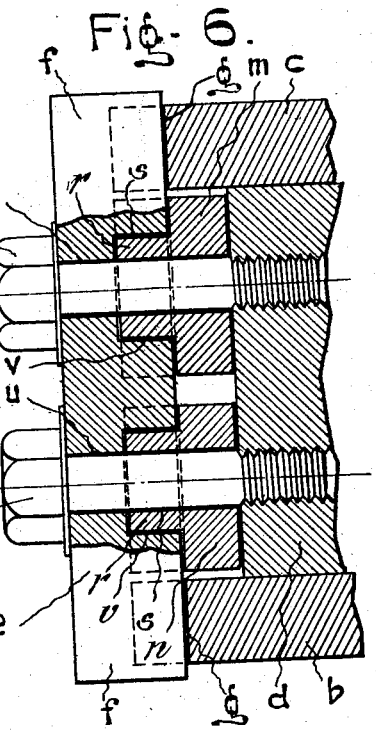
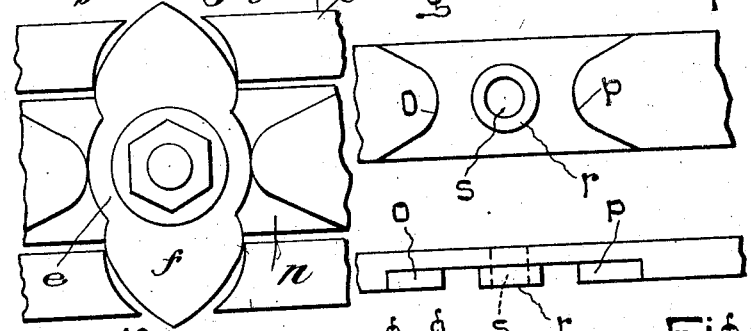
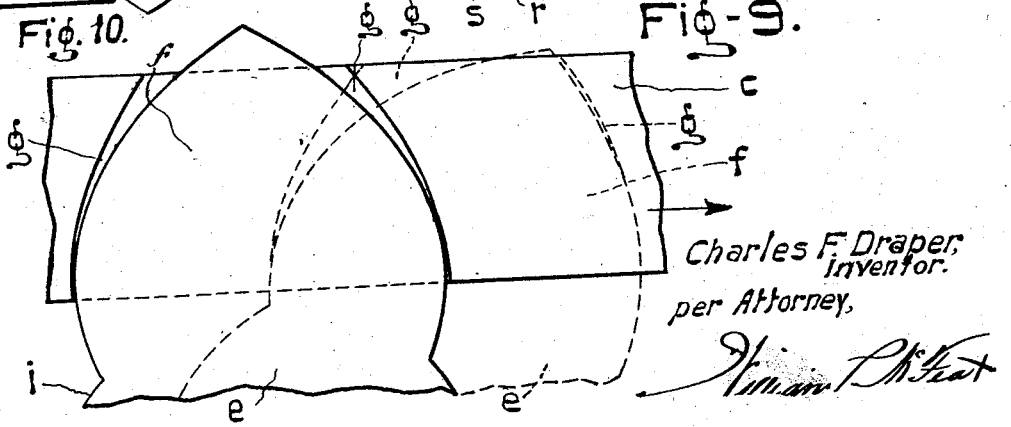
Charles F. Draper,
Inventor.
per Attorney, Patented Nov. 17, 1925.

1,562,312

UNITED STATES PATENT OFFICE.

CHARLES F. DRAPER, OF WESTMOUNT, QUEBEC, CANADA.

ROLLER BEARING.

Application filed August 9, 1923. Serial No. 656,475.

*To all whom it may concern:*

Be it known that I, CHARLES F. DRAPER, of the city of Westmount, Province of Quebec, Canada, a subject of the King of Great Britain, have invented certain new and useful Improvements in Roller Bearings; and I do hereby declare that the following is a full, clear, and exact description thereof.

My invention relates particularly to nested rollers and the means for preventing displacement of the rollers from their correct position relative to bearers, preventing slipping between rollers and bearers, and preventing relative displacement between the rollers from alignment normal to the direction of movement.

The invention also relates to a single roller.

Heretofore serious trouble has been experienced in roller bearings owing to such displacements and slipping, although parallelism between the rollers may have been maintained.

In other instances where prevention of displacement has been attempted the controlling devices between the rollers and bearers have been inaccessible once the nest has been assembled.

My invention is a solution of the problems arising from these defects, and it consists of roller-controlling exterior devices effecting engagement between the rollers and the bearers, such engagement being obtained by involute spiral projections of the controlling devices. The engagement between the devices and the rollers being by means effecting engagement between side bars and the devices, such side bars connecting the nested rollers together.

More specifically stated the connection between the devices and rollers may be by trunnions projecting from the ends of preferably certain of the rollers on which trunnions the side bars and controlling devices are mounted. These side bars may be adapted to rotatably engage the devices either by shoulders on the side bars for bearing engagement with the sides of the devices or bosses to engage circular openings in the devices or both.

For full comprehension, however, of my invention reference must be had to the accompanying drawings in which similar reference characters indicate the same parts and wherein:

Figure 5 is a detail elevation of my improved controlling member removed;

Figure 6 is an edge view of the controller;

Figure 7 is a detail side elevation of a fragment of one of the side bearings illustrating the bearing relation between the same and the roller-controlling member;

Figure 8 is a plan view thereof;

Figure 1:
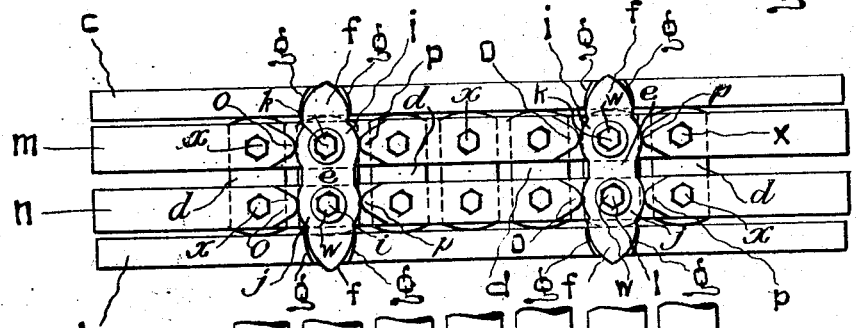
Figure 1 is an end view of a roller bearing equipped with my improved controlling devices.
Figure 2:
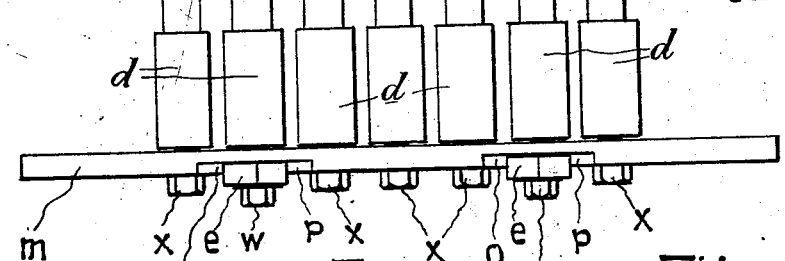
Figure 2 is a plan view of the nest of rollers with my invention applied thereto.
Figure 3:
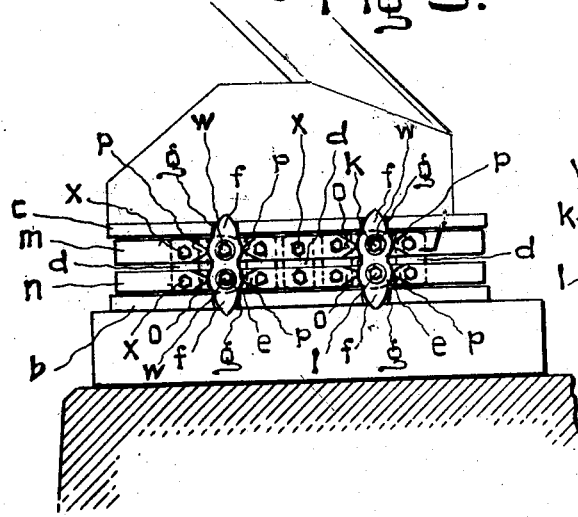
Figure 3 is a side elevation of a portion of an end pier and bearing member of a bridge with my invention applied thereto.
Figure 4:
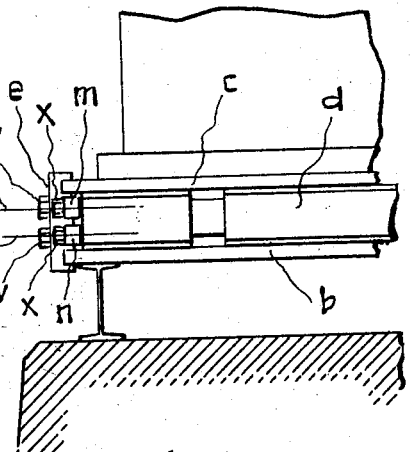
Figure 4 is an elevation at right angles to the view in Figure 3.

Figure 9 is a detail diagrammatic view drawn to a larger scale of the bearing relation between the cam and the face with which it contacts in one direction or the other, the position illustrated in full lines in this figure being the one before movement in either direction; and the dotted line position shows the bearing relation between the cam and the rear wall when the bearing member is moving in the direction indicated by the arrow; and Figure 10 illustrates the usual cylindrical roller with my controller applied thereto.

Although I have illustrated my roller bearing applied to a bridge end nevertheless it is applicable wherever roller bearings are required in either fixed structures or rolling stock having limited relative movement between certain of its parts.

The bearing proper consists of a base $b$ and a relatively movable bearing member $c$ between which are located a nest of anti-friction rollers $d$. Many attempts have been made to control the movement of these rollers to prevent displacement thereof relatively to each other and the base and bearing member with more or less success but in all these devices it has been practically impossible to equip rollers with new controlling devices or to repair controlling devices without jacking up the bearing members. Furthermore slipping of the rollers between the bearers has caused serious damage to both the bearing member and rollers. I overcome these defects by providing a series of preferably four controlling devices $e$ connected to the opposite ends of two of the rollers of the group, such controllers presenting oppositely projecting cams $f$ of involute spiral form. These cams enter notches $g$ in the edges of the bearing member and base and the walls of the notches practically conform in contour to the path followed by the cams as the bearing member moves relatively to the base, this particular form of the walls of the notch and its relation to the cam face is illustrated in detail in Figure 9. I have illustrated segmental rollers and the particular form of controlling devices required for this style of roller; while in Figure 10 I illustrate the well known cylindrical roller with my improved controller applied thereto. This controller for segmental rollers is formed with two circular portions $i$ and $j$, the centres of which are spaced to coincide with points $k$ and $l$ on the long axis of the roller and between the center of the roller and its segmental periphery. In order to connect the nest of rollers movably together and in definite spaced relation I employ a pair of side bars $m$ and $n$ respectively, each notched to present a pair of rounded bearing shoulders $o$ and $p$, respectively, spaced a distance apart to afford a snug bearing between them for the circular parts $i$ and $j$ of the controller. All four of these controllers are of the same construction and each is shaped with the circular portions at either end of a middle connecting portion $e$.

The connection between the controllers and the rollers may be effected in many different ways within the scope of my invention. The connection I have selected is a hub $r$ encircling the hole $s$ within the notch between the shoulders $o$ and $p$ of each side bar while the controller has holes $t$ and $u$ respectively within circular recesses $v$ adapted to fit rotatably over the hubs, and screw bolts $w$ fastening the controllers rotatably in place through the holes $t$, $u$ and $s$, the inner end of the screw taking in the threaded holes in the rollers. The remaining rollers of the group are connected to the side bars by screw bolts $x$.

Movement of the bearing members in the direction indicated by the arrow rolls the rollers in the direction indicated by the arrow in Figure 9 and the notches $g$ in the bearers carrying with them the upper ends of the controllers which move with the rollers, the particular involute spiral contour of the cams permitting a sliding engagement to exist between the aft walls of the notches and sides of the cams at the upper and lower ends of the controllers. Simultaneously the circular portions of the controllers are in sliding contact with the shoulders $o$ and $p$ on the side bars as well as between the circular recesses $v$ and hubs $r$ and through them connection is maintained through the bolts $w$ and $x$ with the rollers thus constantly maintaining the latter in the positions relatively to one another and to the bearer and base in which they are initially set.

In the event of the bearing faces of the cams, circular portions of the controllers, the hubs $r$ and shoulders $o$ and $p$ or any of them becoming worn or for other reasons requiring renewal, any or all of the controllers and the side bars may be removed and new ones substituted without jacking up or otherwise in any way jeopardizing the relative positions of the bearers, rollers or base.

What I claim is as follows:—

1. In a roller bearing the combination with a base, a roller resting on the base and a bearer resting on the roller, of a controller connected to an end of the roller and having oppositely projecting similar cams slidably engaging openings in the base and bearer.

2. In a roller bearing the combination with a base, a roller resting on the base and a bearer resting on the roller, of a controller connected to an end of the roller and having oppositely projecting involute spiral cams slidably engaging openings in the base and bearer.

3. In a roller bearing the combination with a base, a roller resting on the base and a bearer resting on the roller, of a controller connected to an end of the roller and having oppositely projecting involute spiral cams slidably engaging openings in the base and bearer, the said openings presenting walls conforming to the paths of the faces of the cams in their sliding movement within the openings.

4. The combination with a base, a nest of rollers resting on the base and a bearer resting on the rollers, a pair of side bars, one located along the ends of the rollers at one side of the nest and the other side bar located along the ends of the rollers at the opposite side of the nest, means connecting the side bars to the rollers, a pair of controllers located respectively at opposite ends of a roller and the base and bearer having openings in line with the controllers, the said controllers having cams projecting into sliding engagement with the openings in the base and bearer and means rotatably connecting the controllers to the side bars and means maintaining the side bars in pivotal relation to the controller.

5. The combination with a base, a nest of rollers resting on the base and a bearer resting on the rollers, a pair of side bars, one located along the ends of the rollers at one side of the nest and the other side bar located along the ends of the rollers at the opposite side of the nest, means connecting the side bars to the rollers, a pair of controllers located respectively at opposite ends of a roller and the base and bearer having openings in line with the controllers, the said controller having cams projecting into sliding engagement with the ends of the openings in the base and bearer and means rotatably connecting the controllers to the side bars in fixed pivotal position.

6. The combination with a base, a nest of segmental rollers resting on the base and a bearer resting on the rollers, two pairs of side bars, one pair located along the ends of the rollers at one side of the nest and the other pair of side bars located along the ends of the rollers at the opposite side of the nest, means connecting the side bars to the rollers at points above and below the centers of the rollers, a pair of controllers located at opposite ends of a pair of the rollers and the base and bearer being notched in line with the controllers, the said controllers having cams projecting into sliding engagement with the notches in the base and bearer and means connecting the controllers and side bars in fixed pivotal position.

In testimony whereof I have signed my name to this specification at Toronto, this tenth day of June, 1925.

CHARLES F. DRAPER.